March 10, 1970 W. L. ROCHETTE 3,500,382

DIGITAL COMPARATOR

Filed March 28, 1966

*INVENTOR.*

WALTER L. ROCHETTE

*BY* Joseph R. Dwyer

ATTORNEY

3,500,382

DIGITAL COMPARATOR

Walter L. Rochette, Glendora, Calif., assignor to Singer-General Precision, Inc., a corporation of Delaware Filed Mar. 28, 1966, Ser. No. 538,041
Int. Cl. G08c *9/08*
U.S. Cl. 340—347 1 Claim

ABSTRACT OF THE DISCLOSURE

An electromechanical comparator for generating an output signal when the particular binary number read from a rotatable coded disc corresponds with a binary number of an input command signal. The binary coded disc contains a plurality of commutator tracks each containing a true and a false feed track connected to switching segments which are interlaced to form a switching track. The binary number of the command signal selects the particular true and false feed track in each commutator disc and when the rotatable disc is rotated, an output signal is produced when the code read from the disc corresponds with the command signal and there is series continuity through the selected commutator tracks.

Figure 1:
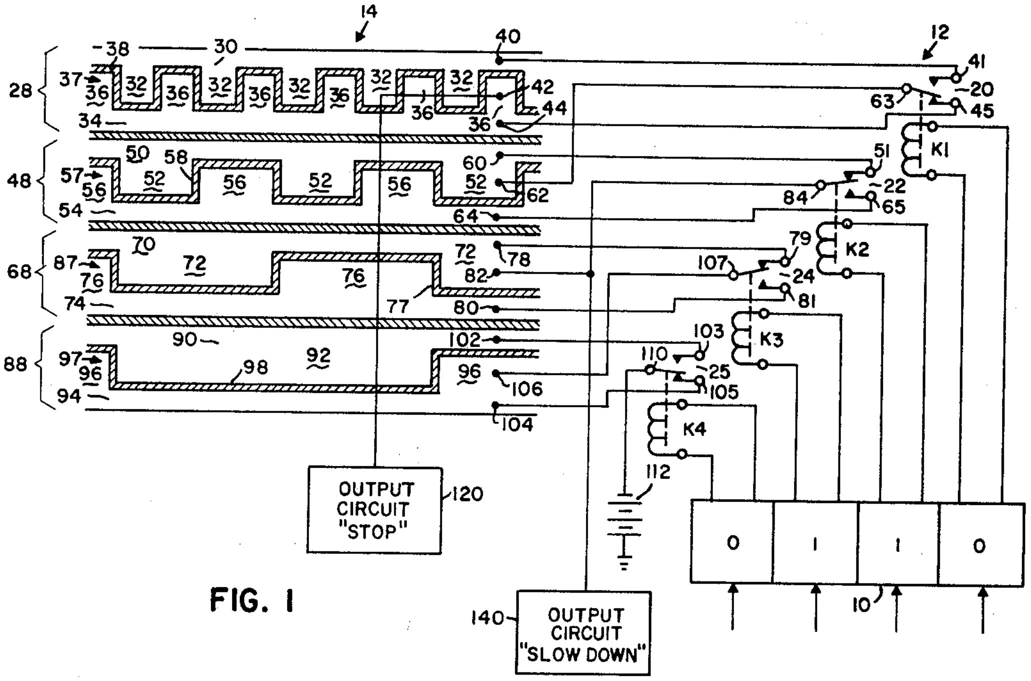

This invention relates to digital comparators, and more particularly to a novel and improved digital comparator which is capable of detecting coincidence or, if desired, approach to coincidence between a command digital code word provided by an external source and a digital code word representing an analog function such as a shaft position or the like.

Equipment has heretofore been developed in the prior art which detects coincidence and/or approach to coincidence between a commanded code word and a digital code word representing an analog function such as a shaft position or the like. Such prior art equipment has comprised of digital circuits with an electronic logic element which performs addition or subtraction function. Another technique for accomplishing such resutls includes analog-digital systems using synchros, servos, torque motors, and servo motors. Other techniques in the prior art have included using null sensing devices which use, for example, self-balancing potentiometers or the like.

The present invention provides a simple and far less expensive digital comparator as compared to the above-mentioned prior art for detecting coincidence or approach to coincidence of a position represented by an analog function and may, as an example include a rotating shaft and a command signal. The command signal may be an indication when it is desirous for the shaft to cease rotation. When a circulating representation of the analog function coincides with the command word, it may be desirous to generate a signal indicating coincidence has occurred.

Briefly described, the present invention provides a digital comparator which includes a coded commutator and an array of sensing elements. The commutator and the array of sensing elements are capable of being movable with respect to each other. The code on the commutator comprises a plurality of code tracks arranged to present a coded representation of the analog-function of the rotation of the commutator with respect to the array of sensing elements.

The code tracks are grouped in a plurality of three subtracks: a FALSE track, a TRUE track, and a switchable track. The FALSE track and the TRUE track each has a plurality of segments contiguously coupled thereto forming FALSE segments and TRUE segments. The FALSE segments and TRUE segments are alternately interlaced to form the switchable track. The FALSE track receives electrical signals which are the complements of the electrical signals received by the TRUE track. Therefore, each adjacent segment in the switchable track receives a complementary electrical signal.

A code word command is presented to a register which in turn sets a plurality of associated switching elements which electrically energize either a TRUE track or a FALSE track in each code track group. When the array of sensing elements detects a continuity of signal through the sensing elements associated with the switchable track of the commutator, which is coincident with the code word in the register and in the switching elements, appropriate means will either discontinue the motion of the commutator, or sensing elements, or indicate that coincidence has occurred.

Further, this invention provides a signal to an outside source when the position of the moving element indicates approach to coincidence between the signal on the switching array and the desired upcoming position of the commutator or sensing elements. Appropriate means can then either slow the motion or indicate that coincidence is approaching.

It, therefore, becomes one object of this invention to provide a new and improved electro-mechanical digital comparator which is capable of comparing a digital representation of an analog function to a particular commanded code word.

Another object of this invention is to provide a new and improved digital comparator which detects coincidence between a significant digital input code word, which may be stored in the register or in the switching array, and the digital representation of a specific analog function such as linear or rotational position.

Another object of this invention is to provide a new and improved digital comparator which detects an approach to coincidence between the code word stored in a register or in a switching array and the digital representation of an analog function.

Another object of this invention is to provide a new and improved digital comparator which is simplified in its operation and its manufacture as compared to prior art comparators of its class.

Figure 2:
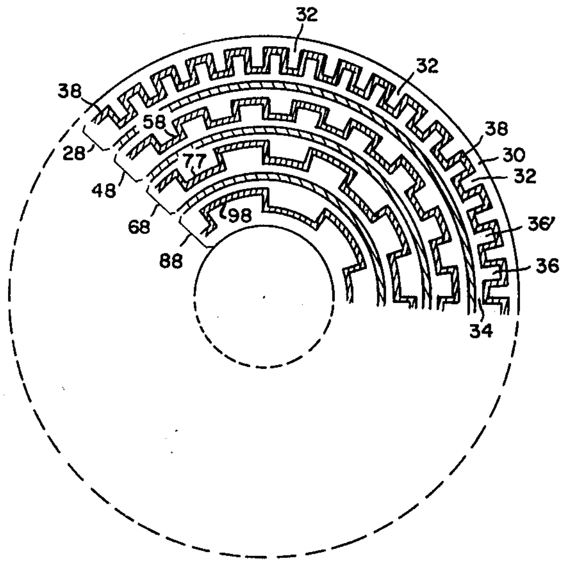

In the drawings illustrating one preferred embodiment of this invention:

FIGURE 1 illustrates a linear version of a code member which might be used with this invention, and its associated circuitry; and FIGURE 2 is a view illustrating a code disc that might be used with the preferred embodiment of this invention.

Turning now to a more detailed description of this invention, the numeral 10 represents a storage register which has a plurality of outputs which are capable of presenting a specific code word in the form of binary signals or the like to a bank of relays 12. The code word is indicative of some particular position on a code commutator 14 with which the contents of register 10 is then used to set relays K1–K4 whereby if a binary 1 is stored in the output line in the location of register 10 leading to K1, it may cause that relay to position a switch 20 to its logically TRUE position. On the other hand, if a binary 0 is stored in that particular location of register 10 leading to relay K1, it is presented to relay K1 and set switch 20 to its logically FALSE position. Each relay in the array of relays 12 has its own particular switch which is operated by the relays K1–K4 by specific data stored in the register 10. Relay K2 operates a switch 22, relay K3 operates a switch 24, and relay K4 operates a switch 25.

Code commutator 14 comprises a plurality of digit tracks which are electrically conductive wherein digit track 28, which indicates a single significant digit and in this embodiment it is the least significant digit, comprises a TRUE track 30 which may be indicative of a binary 1. TRUE track 30 further comprises TRUE segments 32 which are electrically coupled to TRUE track 30. Digit track 28 further comprises FALSE track 34 which may be indicative of a binary 0 and which further comprises a plurality of FALSE segments 36. FALSE segments 36 are electrically coupled to FALSE track 34. TRUE track 30 and associated TRUE segments 32 are insulated from FALSE track 34 and associated FALSE segments 36 by an insulated strip 38. FALSE segments 36 are alternately placed between TRUE segments 32, thus forming switching track 37 which is best shown in FIGURE 2 on a circular type code disc. TRUE track 30 has an input feed brush 40 associated therewith which is coupled to terminal 41 of switch 20. An output brush 42 which is associated with switching track 37 is coupled to an output circuit. Feed brush 44 is associated with the FALSE track 34 and is coupled to terminal 45 of switch 20. Therefore, as relay K1 is set in a predetermined position, depending upon the state of the least significant digit of the code word stored in register 10, it may be either connected to terminal 41 and feed brush 40 or terminal 45 and feed brush 44.

The next digit track 48 comprises a TRUE track 50 which may be indicative of a binary 1. TRUE track 50 comprises a plurality of TRUE segments 52 which are electrically coupled to the TRUE track 50. Digit track 48 further comprises a FALSE track 54 which may be indicative of a binary 0. FALSE track 54 further comprises a plurality of FALSE segments 56. TRUE segments 52 and FALSE segments 56 are alternately placed between one another to form a switching track 57. TRUE track 50 and associated TRUE segments 52 are insulated from FALSE track 54 and associated FALSE segments 56 by an insulated strip 58. A feed brush 60 associated with TRUE track 50 is coupled to terminal 51 of switch 22. A feed brush 62 is associated with switching track 57 and is coupled to terminal 63 of switch 20 relay K1. Feed brush 64 is associated with the FALSE track 54 and is coupled to terminal 65 of switch 22.

A digit track 68 comprises a TRUE track 70 which is a plurality of TRUE segments 72 which are electrically coupled to TRUE track 70. Digit track 68 further comprises a FALSE track 74 which has a plurality of FALSE segments 76 which are electrically coupled to FALSE track 74. A switching track 77 is formed of the alternately adjacent TRUE segments 72 and FALSE segments 76, similar to the preceding switching tracks. TRUE track 70 and TRUE segments 72 are insulated from FALSE tracks 74 and FALSE segments 76 by the insulated strip 77. A feed brush 78 associated with the TRUE track 70 is coupled to terminal 79 of switch 24. Feed brush 80 is associated with FALSE track 74 and is coupled to terminal 81 of switch 24. Feed brush 82 is associated with switching track 77 and is coupled to terminal 84 of switch 22.

The final digit track 88 used with this embodiment comprises a TRUE track 90 which has a plurality of TRUE segments 92. TRUE track 90 is electrically coupled to TRUE segments 92. Digit track 88 further comprises FALSE track 94 which has a plurality of FALSE segments 96. FALSE track 94 is electrically coupled to FALSE segments 96. A switching track 97 is formed of alternate TRUE segments 92 and FALSE segments 96. TRUE track 90 and TRUE segments 92 are insulated from FALSE track 94 and FALSE segments 96 by a strip of insulating material 98. Feed brush 102 associated with TRUE track 90 is coupled to terminal 103 of switch 25 and feed brush 104 is associated with FALSE track 94 and is coupled to the terminal 105 of switch 25. A switching brush 106 associated with switching track 97 is coupled to terminal 107 of switch 24.

The terminal 110 of switch 25 is coupled to some voltage source such as the battery 112.

When a particular code word is loaded into storage register 10 and for the preferred émbodiment showing one example of the invention, the binary number is 0110. The least significant digit being a 0 bit in register 10 will set relay K1 to its FALSE position, thereby switching the switch 63 in contact with the terminal 45 coupling the FALSE track 34 of the code commutator 14 to switching track 57 of the digit track 48. The next significant bit in register 10 being 1 will set the relay K2 to its TRUE position, enabling TRUE track 50 to be coupled to the switching track 87 of track 68. The next significant digit being a 1 enables relay K3 to couple the switching track 97 of the most significant digit track 88 to the TRUE track of 68; and finally, the most significant digit sets a 0 to the relay K4, coupling the false track to the battery 112. When the continuity between battery 112 and the output circuit 120 is complete, indication can be made to either stop the motion of the commutator, or of the brushes, or otherwise communicate that this coincidence has appeared.

Should it be necessary to indicate approach to coincidence, when tracks 68 and 88 show coincidence with the relays K3 and K4, and the most significant digit is 0 and the next most significant digit 1 has been loaded in register 10, output circuit 140 is enabled, which may either slow down the motion of commutator 14 or make some indication that coincidence is approaching.

It should be understood that cascading discs on rotary commutator, having different speeds of rotation can be comtemplated to increase the resolution of the comparator and that multiple input turns will then be allowed on the input disc before coincidence is reached.

Having thus described one embodiment of this invention, what is claimed is:

1. A digital comparator comprising:

a rotatable input information member having a plurality of commutator tracks on at least one surface, each of said tracks comprising first and second feed segments, each coupled to a plurality of switching segments, said switching segments of said first feed segment being alternated with the switching segments of said second feed segment to form a switching track, said switching segments in said switching track being of varying lengths to represent a binary code having bits of varying ordinal significance;

a group of three commutator brushes positioned for contact with each of said commutator tracks, said group comprising a feed brush positioned to contact each feed segment of a commutator track and a sensing brush positioned to contact the switching track;

input means for introducing a digital command signal into said comparator;

circuit means coupled to said input means, to said feed brushes, and to said sensing brushes for applying a signal voltage to the particular one of the first and second feed segments selected by the most significant digital command signal digit in the most significant digit commutator track, and for applying said signal voltage sensed by a sensing brush to the particular one of the first and second feed segments selected by the input command signal in the next lower significant digit commutator track; and means coupled to the sensing brush in the least significant digit commutator track for producing an output signal when said sensing brush senses said signal voltage.

References Cited

UNITED STATES PATENTS

| | | | |
|---|---|---|---|
| 2,764,344 | 9/1956 | Wescott | 340—347 |
| 2,792,545 | 5/1957 | Kamm | 340—347 |
| 2,899,673 | 8/1959 | Reiner | 340—146.2 |
| 2,907,020 | 9/1959 | Champion | 340—347 |
| 3,038,153 | 6/1962 | Metz | 340—347 |

MAYNARD R. WILBUR, Primary Examiner

JEREMIAH GLASSMAN, Assistant Examiner

U.S. Cl. X.R.

340—146.2